United States Patent
Catinis (10) Patent No.: US 9,899,823 B1
(45) Date of Patent: Feb. 20, 2018

(54) APPARATUS AND METHOD FOR SHELTERING ELECTRICAL CORD CONNECTIONS

(71) Applicant: George E. Catinis, River Ridge, LA (US)

(72) Inventor: George E. Catinis, River Ridge, LA (US)

( * ) Notice: Subject to any disclaimer, the term of this patent is extended or adjusted under 35 U.S.C. 154(b) by 0 days.

(21) Appl. No.: 15/464,613

(22) Filed: Mar. 21, 2017

(51) Int. Cl.
*H02G 9/04* (2006.01)
*A45F 3/44* (2006.01)
*F16L 3/06* (2006.01)

(52) U.S. Cl.
CPC ............. *H02G 9/04* (2013.01); *A45F 3/44* (2013.01); *F16L 3/06* (2013.01)

(58) Field of Classification Search
CPC ........... H02G 9/04; H02G 15/00; H02G 9/06; H02G 15/007; H02G 15/08; H02G 15/06; H02G 15/10; H02G 15/103; H02G 15/184; A45F 3/44; F16L 3/06; F16L 3/08; F16L 3/085
USPC ........ 174/140 H, 68.1, 68.3, 72 A, 74 R, 66, 174/67, 91, 92, 135; 439/367, 368, 449; 248/68.1, 49
See application file for complete search history.

(56) References Cited

U.S. PATENT DOCUMENTS

| | | |
|---|---|---|
| 2,037,907 A | 4/1936 | Johnson |
| 3,014,194 A | 12/1961 | Berglund |
| 3,029,408 A | 4/1962 | Anderson |
| 3,281,755 A | 10/1966 | Trager |
| 3,654,588 A | 4/1972 | Ruth |
| 3,663,926 A | 5/1972 | Brandt |
| 3,798,788 A | 3/1974 | Kuntz |
| 3,971,614 A | 7/1976 | Paoli et al. |
| 4,143,934 A | 3/1979 | Siebert |
| 4,184,732 A | 1/1980 | Hudson |
| 4,291,933 A | 9/1981 | Kakaris |
| 4,484,790 A | 11/1984 | Schildkraut et al. |
| 4,643,505 A | 2/1987 | House et al. |
| 4,664,463 A | 5/1987 | Carmo |
| 4,702,541 A | 10/1987 | Arnold |
| 4,784,612 A | 11/1988 | Ryan |

(Continued)

FOREIGN PATENT DOCUMENTS

| | | |
|---|---|---|
| GB | 660508 A | 11/1951 |
| JP | 10151217 A | 6/1998 |

(Continued)

*Primary Examiner* — Angel R Estrada
(74) *Attorney, Agent, or Firm* — AdamsIP, LLC; Gary N. Stewart; Stephen Thompson (57) ABSTRACT

An apparatus and method for sheltering electrical cord connections are provided. The apparatus is designed to protect electrical connections formed between electrical cords from precipitation by sheltering and elevating the electrical connection above a ground surface. The apparatus has an elongated support member having a first end to which a shelter is secured and a second end that secures the apparatus to a ground surface. A securing member disposed between the first end and second end of the support member is designed to support an electrical cord and electrical connections formed thereby above a ground surface. The shelter shields any electrical cord and connection held above the ground surface by the securing member from falling precipitation such as rain or snow.

19 Claims, 4 Drawing Sheets

(56) References Cited

U.S. PATENT DOCUMENTS

| | | | |
|---|---|---|---|
| 4,826,448 A * | 5/1989 | Maddock | H01R 4/2412 439/409 |
| 4,869,683 A | 9/1989 | Nelson | |
| 4,940,424 A | 7/1990 | Odbert | |
| 4,996,636 A * | 2/1991 | Lovett | F21S 8/081 439/414 |
| 5,104,335 A | 4/1992 | Conley | |
| 5,179,044 A | 1/1993 | Muromachi | |
| 5,217,387 A | 6/1993 | Hull | |
| D338,190 S | 8/1993 | Bradbury | |
| 5,306,176 A | 4/1994 | Coffey | |
| 5,502,280 A | 3/1996 | Rocci et al. | |
| 5,505,634 A | 4/1996 | Osten | |
| 5,549,482 A | 8/1996 | Langlais | |
| 5,551,888 A * | 9/1996 | Rhodes, Sr. | H01R 13/6392 439/367 |
| 5,772,462 A | 6/1998 | Osten | |
| 5,834,690 A * | 11/1998 | Bastiaansen | H01R 13/5213 174/551 |
| 6,036,525 A | 3/2000 | Alfis, III | |
| 6,300,570 B1 * | 10/2001 | Lai | H01R 25/003 174/67 |
| 6,837,255 B2 | 1/2005 | Bunch | |
| 6,878,007 B1 | 4/2005 | Decker | |
| 6,881,901 B2 | 4/2005 | Egan | |
| 7,001,202 B2 | 2/2006 | Robbins | |
| 7,041,899 B2 * | 5/2006 | Stekelenburg | H01R 25/00 174/50 |
| 7,465,182 B1 | 12/2008 | McDonald | |
| D589,328 S | 3/2009 | Edge | |
| 7,544,082 B1 * | 6/2009 | Halvorsen | H01R 13/5213 174/135 |
| 7,553,181 B1 | 6/2009 | Van Dalinda, III | |
| D595,804 S | 7/2009 | Tollefson et al. | |
| 7,622,668 B1 | 11/2009 | Tollefson et al. | |
| 7,833,037 B2 | 11/2010 | Reusche et al. | |
| 8,183,475 B2 * | 5/2012 | Dukes | H02G 3/22 174/650 |
| 8,197,278 B2 | 6/2012 | Reusche et al. | |
| 8,225,545 B1 * | 7/2012 | Collins | A01G 9/26 47/23.3 |
| 8,546,694 B1 * | 10/2013 | Harrison | H02G 11/00 174/135 |
| 8,985,586 B1 | 3/2015 | Alpi et al. | |
| 9,425,604 B1 * | 8/2016 | Lawrence | H02G 15/007 |
| 2005/0085118 A1 | 4/2005 | Robbins | |
| 2009/0084601 A1 | 4/2009 | Masinter | |
| 2010/0265715 A1 | 10/2010 | Winstanley et al. | |
| 2012/0115349 A1 | 5/2012 | Kierstead | |
| 2014/0104831 A1 | 4/2014 | Beausoleil | |
| 2014/0293601 A1 | 10/2014 | Beausoleil et al. | |
| 2016/0329132 A1 | 11/2016 | Nooner et al. | |

FOREIGN PATENT DOCUMENTS

| | | |
|---|---|---|
| JP | 310509 U9 | 8/2004 |
| WO | 2016166401 A1 | 10/2016 |
| WO | 2016166420 A1 | 10/2016 |
| WO | 2016178796 A1 | 11/2016 |

* cited by examiner

APPARATUS AND METHOD FOR SHELTERING ELECTRICAL CORD CONNECTIONS

FIELD OF THE DISCLOSURE

The subject matter of the present disclosure refers generally to an apparatus and a method for sheltering electrical cord connections.

BACKGROUND

To create a festive environment, individuals often use a variety of electrical lighting devices, such as string lights, to decorate and light outdoor areas. Typically, such devices have an electrical cord that transfers electrical current form a power outlet to the lighting elements of the device. Often times however, the electrical cords associated with such devices are too short to span from the outdoor area in which the device is positioned to a location having a power outlet. Accordingly, powering these devices often requires the use of one or more extension cords to create an electrical pathway from a power outlet to the lighting device. In such pathways, electrical current is initially transferred from the power outlet to the extension cord by inserting the plug end of the extension cord into the power outlet. Electrical current drawn by the extension cord is subsequently transferred to the lighting device by electrically connecting the extension cord to the lighting device's electrical cord, typically through a plug-to-socket connection.

During use, however, the electrical connection formed between the lighting device and the extension cord often remains in an exposed, outdoor environment due to the lighting device's remote proximity to the power outlet. Accordingly, electrical connections formed in this manner are often subjected to adverse weather conditions including rain and snow. Precipitation entering an electrical connection may cause the devices forming the electrical connection to short circuit or cause circuit breakers, fuses, or ground fault circuit interrupters (GFCI) to trip, thereby stopping the flow of electrical current from a power outlet and powering off any devices relying on power therefrom. Accordingly, precipitation events such as rain or snow frequently hinders or prevents individuals from effectively lighting an outdoor area using such lighting devices.

Although several products have been manufactured to protect electrical connections formed between electrical cords from falling precipitation, known products are largely inadequate during periods of heavy precipitation. Generally, known products exist as protective casings that encapsulate the connectors (usually a plug or socket) disposed at the ends of a first and second electrical cord therein. Such casings often have two openings disposed therein to allow and a first and second cable to pass therethrough and generally rest on a ground surface during use. In the event that the protective casing is positioned on a ground surface that is either impervious to liquids or that becomes fully saturated, precipitation may build up on the ground surface causing the casing to become submerged. Accordingly, the cord openings may serve as an entryway for water to reach and interfere with the electrical connection housed within the casing.

Accordingly, there is a need in the art for an apparatus and method that protects electrical cord connections from becoming submerged during periods of heavy precipitation.

SUMMARY

An apparatus and method for sheltering electrical cord connections are provided. The apparatus of the present disclosure is designed to protect the electrical connection formed between electrical cords from precipitation by sheltering the connection from falling precipitation and elevating the connection above a ground surface. The apparatus generally comprises an elongated support member, a securing member, and a shelter. The support member has a first end to which the shelter is secured and a second end that secures the apparatus to a ground surface. To accommodate various ground surfaces, the design of the second end of the support member may vary. In one embodiment, the second end of the support member may be pointed such that apparatus can be secured to unpaved ground surfaces by inserting the second end of the support member therein. Alternatively, the second end of the support member may be defined by a flat surface that may be secured to paved ground surfaces through the use of adhesives, concrete anchors, or other conventional devices or instruments conventionally used to secure a structure to a paved surface.

Once the apparatus is secured to a ground surface, an electrical cord used to form the electrical connection may be placed on or within a securing member that is configured to support the cord. The securing member is disposed between the first end and the second end of the support member such that when an electrical cord is placed on or within the securing member, the electrical cord is elevated above the ground surface so as to protect the electrical connection from precipitation that may accumulate on the ground surface. Thus, an electrical cord may be positioned within the securing member such that a connector of the electrical cord or any electrical connection formed therewith is held above the ground surface to which the apparatus is secured. In one preferred embodiment, the securing member is a hook. In another preferred embodiment, the apparatus comprises two securing members such that a first electrical cord may be placed on or within one securing member and a second electrical cord may be placed on or within the other securing member. The shelter of the apparatus is secured to the first end of the support member and is configured to shield any electrical cord and electrical connection supported above the ground surface by the support member from falling precipitation, such as rain or snow. In a preferred embodiment, the shelter is a dome having an apex and a rim to prevent precipitation from accumulating on top of the shelter.

The foregoing summary has outlined some features of the apparatus and methods of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the apparatus and methods disclosed herein. Those skilled in the pertinent art should also realize that such equivalent designs or modifications do not depart form the scope of the apparatus and methods of the present disclosure.

DESCRIPTION OF DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term "removably secured" and grammatical equivalents thereof are used herein to mean the joining of two components in a manner such that the two components are secured together, but may be detached from one another without requiring the use of specialized tools.

Unless preceded or qualified by the term "unpaved" or "paved," the term "ground surface" and grammatical equivalents thereof are understood to mean any ground surface, either paved, unpaved, or a combination thereof, to which the second end of the apparatus disclosed herein may be secured. The term "connector" and grammatical equivalents thereof are used herein to mean the component or components of an electrical cord that may be connected to a corresponding component or components of another electrical cord to establish a junction through which electrical current may pass from one electrical cord to the other. Such connectors may include, but are not limited to, plugs and sockets.

Turning now to the drawings, FIGS. 1-6 illustrate preferred embodiments of an apparatus 100 for sheltering electrical cord connections. In one aspect, the apparatus 100 is designed to protect an electrical connection formed between electrical cords, such as a plug and socket connection, from both falling and accumulated precipitation on a ground surface. The apparatus 100 has an elongated support member 110 that has a first end 111 with a shelter 130 secured thereto and a second end 112 that secures the apparatus 100 to a ground surface. Disposed between the first end 111 and the second end 112 of the support member 110 is a securing member 120 configured to support an electrical cord above the ground surface. In a preferred embodiment, the securing member 120 is secured to a platform 140 that is attached to the support member 110 between the first end 111 and the second end 112 of the support member 110.

Once the apparatus 100 is secured to a ground surface, a first electrical cord 210 having a first connector 215 may be placed on or within the securing member 120 such that the first connector 215 is elevated over the ground surface. Accordingly, if the first connector 215 is interlocked with a second connector 225 of a second electrical cord 220, the second connector 225 may also be elevated above the ground surface. In this way, the apparatus 100 may elevate an electrical connection above a ground surface to protect the connection from precipitation that may accumulate thereon, e.g., standing water or snow. In a preferred embodiment, the apparatus 100 comprises two securing members 120 such that a first electrical cord 210 may be supported by one securing member, and a second electrical cord 220 may be supported by a second securing member. The shelter 130 is secured to the support member 110 above the securing member 120 and is configured to shield the securing member and an electrical connection supported above the ground surface by the securing member from falling precipitation.

As shown in FIGS. 1-6, the apparatus 100 generally comprises: an elongated support member 110 having a first end 111 and a second end 112, a securing member 120 disposed between the first end 111 and the second end 112 of the support member 110, and a shelter 130 secured to the first end 111 of the support member 110. The second end 112 of the support member 110 is configured to secure the apparatus 100 to a ground surface. Depending on the nature of the ground surface, the design of the second end 112 of the support member 110 may vary.

Figure 3:
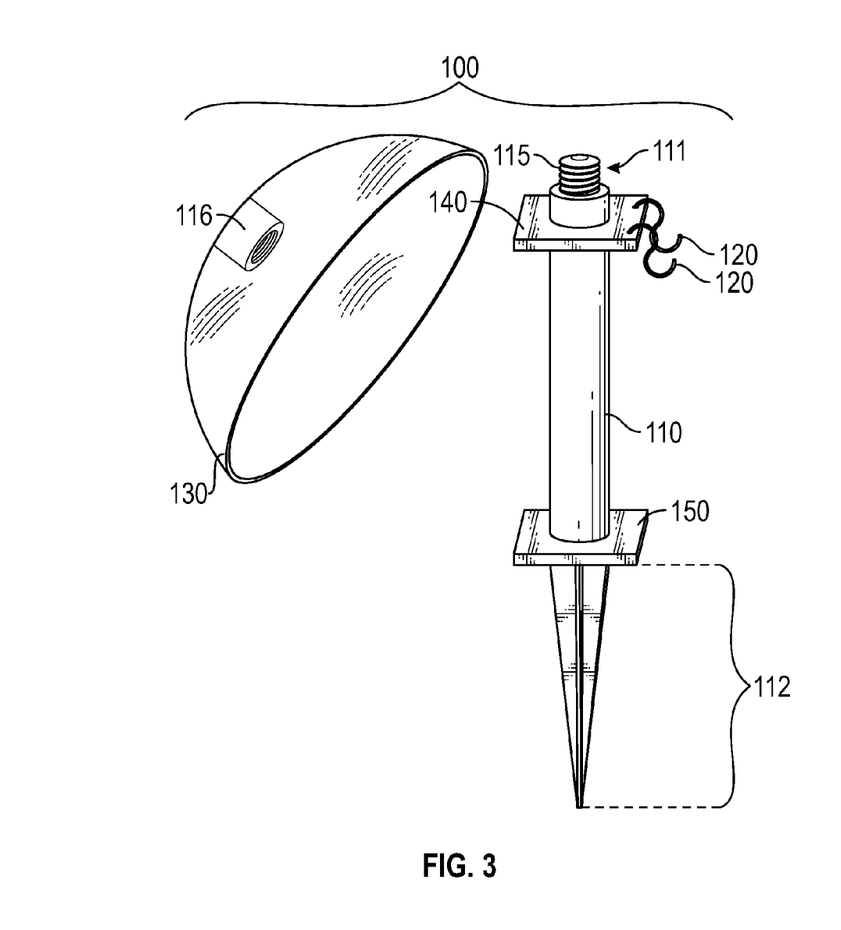
FIG. 3 shows a perspective view of an apparatus embodying features consistent with the principles of the present disclosure.
Figure 4:
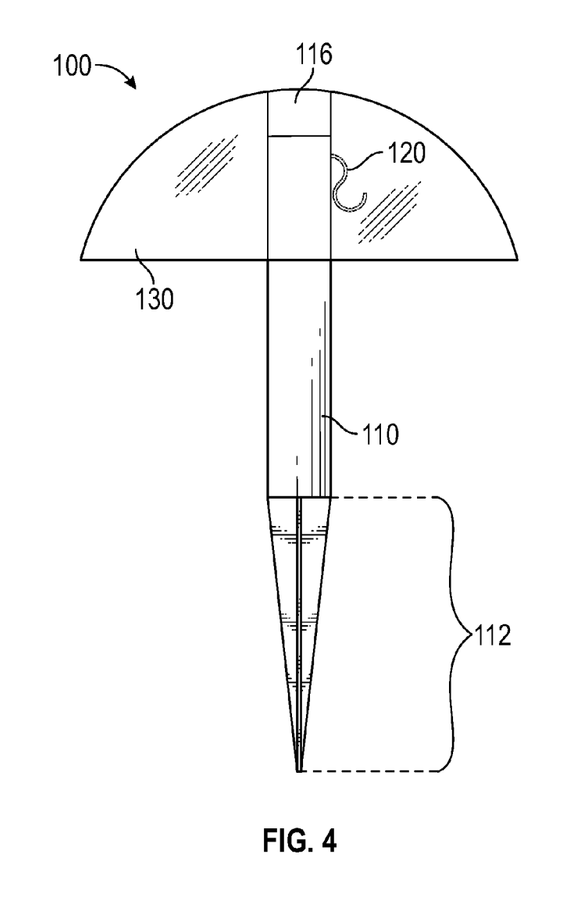
FIG. 4 shows a side elevational view of an apparatus embodying features consistent with the principles of the present disclosure.

In one preferred embodiment, the second end 112 of the support member 110 may be configured to secure the apparatus 100 to unpaved ground surfaces, such as soil, by inserting the second end 112 into the unpaved ground surface. In such embodiments, the second end 112 of the support member 110 is preferably pointed to reduce resistance when inserting the support member 110 into the unpaved ground surface. In one preferred embodiment, the support member 110 is a stake, as best shown in FIG. 3. The apparatus 100 may further comprises a ground plate 150 attached to the support member. The ground plate 150 is configured to prevent the support member 110 from being inserted past the ground plate 150. Thus, the ground plate 150 is positioned to prevent the support member 110 from being inserted too far into the ground to support the electrical connection in an adequately elevated position. The ground plate 150 may serve as a foot mount that may be stepped on to drive the second end 112 of the support member 110 into an unpaved ground surface. To prevent the second end 112 of the support member 110 from rotating within the ground surface once inserted therein, the second end 112 of the support member 110 may be generally shaped like a broadhead arrow tip, as best shown in FIGS. 1 and 3-4.

Alternatively, the second end 112 of the support member 110 may be designed to secure the apparatus 100 to paved ground surfaces, such as concrete or bricked patios, driveways, sidewalks, or courtyards. In such embodiments, the apparatus 100 may be secured to a paved ground surface by securing the second end 112 of the support member 110 thereto through the use of adhesives, concrete anchors, or any other known devices or instruments suitable for anchoring a structure to a paved surface. To ensure the second end 112 rests flush with a paved ground surface, the second end 112 of the support member 110 may be defined by a flat surface. As shown in FIG. 2, in one embodiment, a ground plate 150 may define the second end 112 of the support member 110. In an alternative embodiment, a stake, or other pointed object, may be removably secured to the bottom of the ground plate 150 to enable the second end 112 to convert from being pointed, as shown in FIG. 1, to being flat, as shown in FIG. 2.

Figure 1:
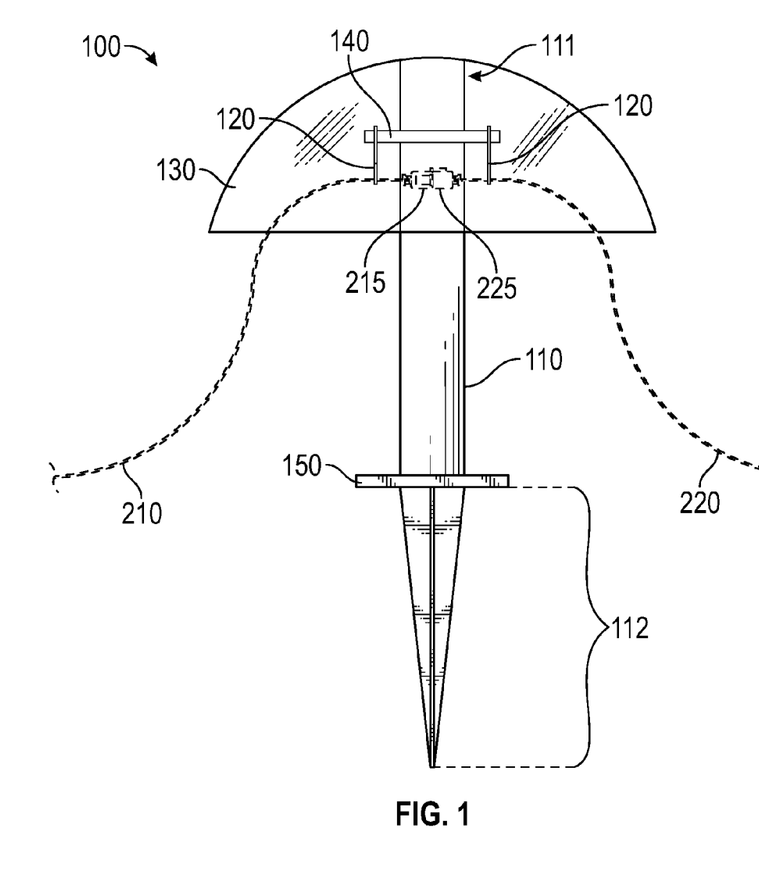
FIG. 1 shows a side elevational view of an apparatus embodying features consistent with the principles of the present disclosure.
Figure 2:
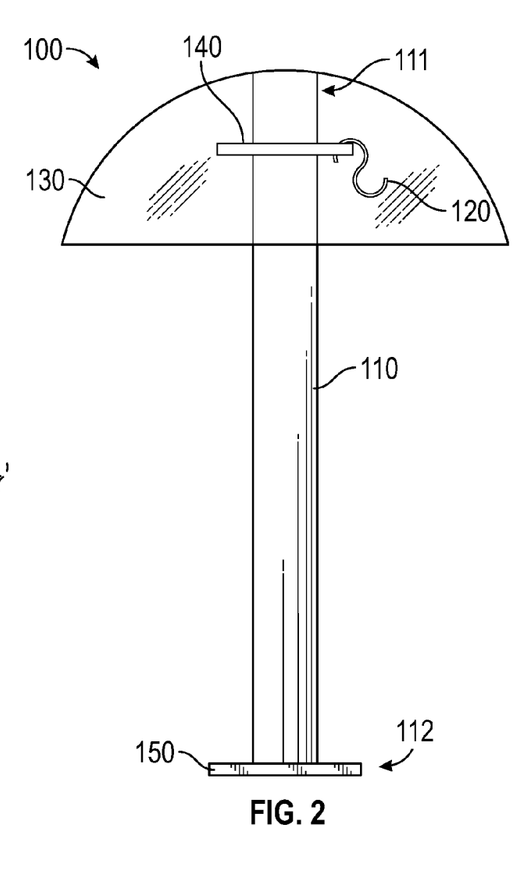
FIG. 2 shows a side elevational view of an apparatus embodying features consistent with the principles of the present disclosure.

As best shown in FIG. 1, the securing member 120 is disposed between the first end 111 and the second end 112 of the support member 110 and is configured to support an electrical cord above the ground surface to which the apparatus 100 is secured. In a preferred embodiment, the securing member 120 is a hook, as best shown in FIGS. 2-4. However, one of skill in the art will appreciate that the securing member 120 may be any instrument or device suitable for supporting an electrical cord above a ground surface including, but not limited to, nails, screws, rods, hook and loop fastener strips, clasps, or clamps.

As further shown in FIG. 1, a first electrical cord 210 having a first connector 215 may be placed on or within the securing member 120 such that the first connector 215 is elevated above the ground surface. In turn, if a second connector 225 of a second electrical cord 220 is interlocked with the first connector 215, the second connector 225 may also be held above the ground surface. In this way, the securing member 120 may secure an electrical connection in an elevated position above the ground surface, and thus above any precipitation that may accumulate on the ground surface. When the electrical connection formed by a first connector 215 and a second connector 225 is supported by the securing member 120, the first electrical cord 210 and the second electrical cord 220 may form an arch above the ground surface. In a preferred embodiment, the apparatus 100 comprises two securing members 120, as best shown in FIGS. 1 and 3. In such embodiments, a first electrical cord 210 and a second electrical cord 220 may be supported above the ground surface by individual securing members 120, as shown in FIG. 1. As further shown in FIG. 1, the electrical cords may be positioned on or within the respective securing members such that the connection formed by the first and second connectors 215, 225 is positioned between the individual securing members and horizontally supported above the ground surface.

Preferably, the securing member 120 is disposed substantially near the first end 111 of the support member 110 to elevate an electrical cord supported by the securing member 120 as high as possible above the ground surface. In one preferred embodiment, the support member 110 and securing member 120 are configured such that the lowermost portion of the securing member 120 is positioned approximately eight to twelve inches above the ground surface when the apparatus 100 is secured in place. However, one of skill in the art will appreciate that the dimensions of the support member 110 and securing member 120 may be adjusted to increase or decrease the height in which the lowermost portion of the securing member 120 is elevated above the ground surface during use. Accordingly, dimensions of the apparatus 100 may be adjusted, during manufacturing or otherwise, to support electrical cords and connections at higher or lower positions above the ground surface. In some instances, the securing member 120 may be designed such that the electrical connection formed between a first connector 215 and a second connector 225 itself may be placed on or within the securing member. In one preferred embodiment, the support member 110 may be telescopic such that the height to which the securing member 120 is elevated above the ground surface may be increased or decreased by extending or collapsing the support member 110, respectively.

In a preferred embodiment, the apparatus 100 further comprises a platform 140 to which the securing member 120 is secured. The platform 140 is attached to the support member 110 between the first end 111 and the second end 112 of the support member 110. Preferably, the platform 140 encompasses the support member 110 such that multiple securing members 120 can be secured thereto, as shown best in FIG. 3. Alternatively, the securing member 120 may be secured directly to the support member 110, as shown in FIG. 4.

The shelter 130 of the apparatus 100 is secured to the first end 111 of the support member 110 and is configured to shelter any electrical cords and electrical connections supported by the securing member 120 from falling precipitation, such as rain or snow. In a preferred embodiment, the shelter 130 is a dome having an apex and a rim to prevent precipitation accumulation on top of the shelter 130. In such embodiments, the shelter 130 is secured to the first end 111 of the support member 110 by its apex such that the rim faces downwardly towards the second end 112 of the support member 110. Preferably, the shelter 130 is of sufficient size such that when the apex of the shelter is secured to the support member 110, the rim of the shelter 130 is positioned below the securing member 120. Accordingly, in some instances, the apparatus 100 may form a generally umbrella-like shape, as shown in FIGS. 1-6. Although a dome is preferred, one of skill in the art will appreciate that the shelter 130 may be of any suitable shape or structure for sheltering the securing member 120 from falling precipitation.

As shown in FIG. 3, the shelter 130 may be removably secured to the first end 111 of the support member 110. In a preferred embodiment, the first end 111 of the support member 110 has a first interlocking member 115 and the shelter 130 has a second interlocking member 116. The first interlocking member 115 is configured to interlock with the second interlocking member 116 to removably secure the shelter 130 to the first end 111 of the support member 110. As shown in FIG. 3, the first interlocking member 115 preferably comprises male threads and the second interlocking member 116 preferably comprises corresponding female threads. In this embodiment, electrical cords may be interconnected and secured to the securing members 120 before securing the shelter 130 to the apparatus. This feature may facilitate ease of securing an electrical connection to the securing members. One of skill in the art should appreciate that any instrument or device configured to removably secure two objects together may be used to secure the shelter to the support member, including, but not limited to, hook and loop fasteners, snap buttons, magnets, screws, nuts and bolts, or nails. Alternatively, the shelter 130 may be permanently secured to the first end 111 of the support member 110, as shown in FIGS. 1-2.

Figure 5:
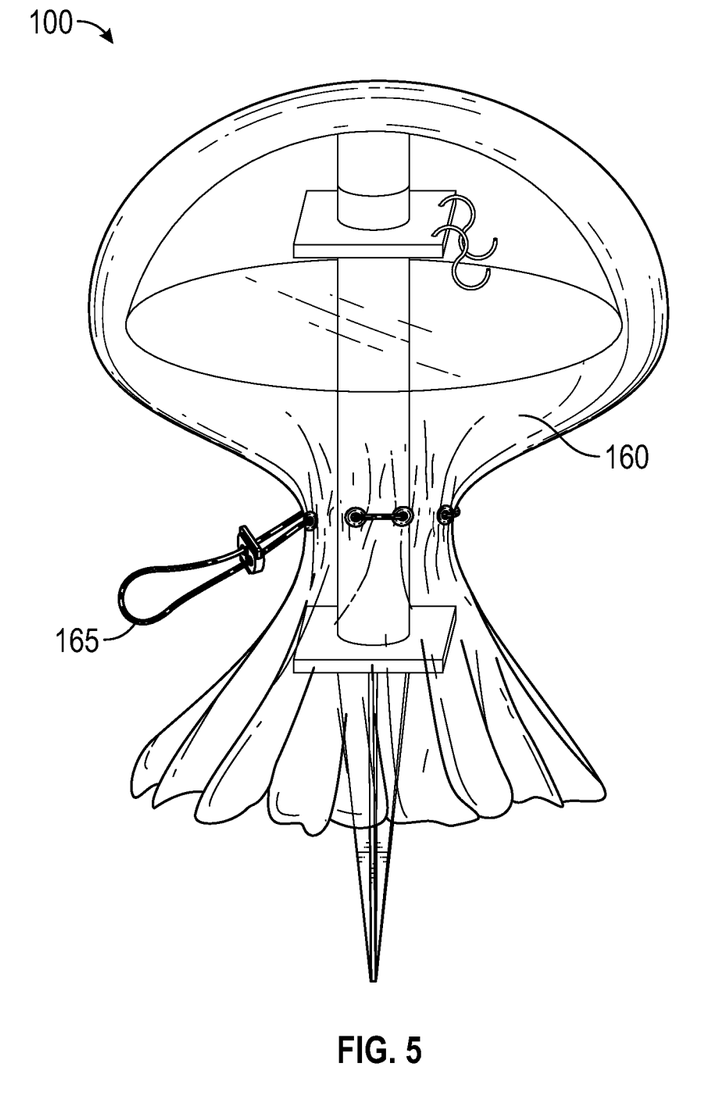
FIG. 5 shows a perspective view of an apparatus embodying features consistent with the principles of the present disclosure.
Figure 6:
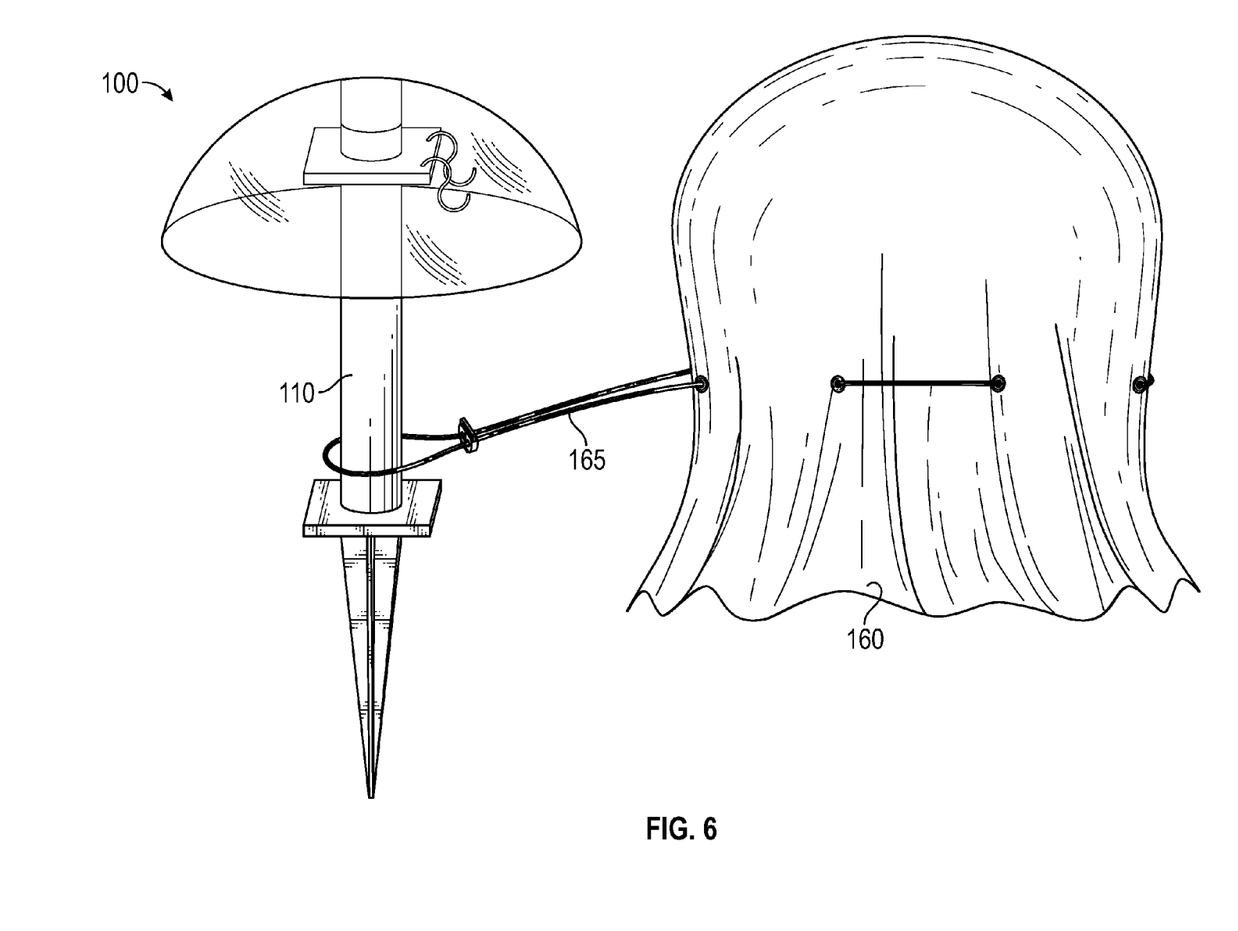
FIG. 6 shows a perspective view of an apparatus embodying features consistent with the principles of the present disclosure.

In a preferred embodiment, the apparatus 100 further comprises a protective cover 160 configured to cover the securing member 120 and the shelter 130. As shown in FIGS. 5-6, the protective cover 160 may be a bag having an open end configured to receive some or all of the components of the apparatus 100 therein. The protective cover 160 may have a drawstring 165 laced therethrough that is configured to transition the protective cover 160 from an open position, as shown in FIG. 6 to a closed position, as shown in FIG. 5, or vice versa. Although the use of a drawstring 165 is preferred, one of skill in the art will appreciate that any instrument or device that may be manipulated to transition the protective cover 160 from an open to closed position, or vice versa, may be used. Such instrument or devices may include, but are not limited to, twist ties, rope, snap buttons, or hook and loop fasteners.

When the protective cover 160 is placed over the apparatus 100 and transitioned to a closed position via the drawstring 165, the protective cover 160 draws in on itself to create a tightened fit around the support member 110, as shown in FIG. 5. In this way, the protective cover 160 may further protect the electrical cord and connections supported by the securing member 120 from accumulated precipitation on the ground surface. In a preferred embodiment, the protective cover 160 is removably secured to the support member 110 between the first end 111 and the second end 112 of the support member 110 by tying or wrapping the drawstring 165 around the support member 110, as shown in FIG. 6.

Because the apparatus 100 is designed for outdoor use, it is preferred that the structural elements of the apparatus 100 be constructed of weather-resistant materials. The structural elements of the apparatus 100 may be made of plastic (e.g., polyethylene, polypropylene, ABS, polycarbonate, nylon, or any other suitable plastics), metal, wood, rubber, stone, a combination thereof, or any other material suitable for the applications disclosed herein. The structural elements of the apparatus 100 may all be made of the same type of material or of different materials.

In another aspect, the present disclosure is drawn to a method for sheltering electrical cord connections in an elevated position. The method is initiated by providing an apparatus 100 having some or all of the structural features consistent with the embodiments disclosed above. The apparatus 100 is subsequently secured to a ground surface in an upright position via the second end 112 of the support member 110. After the apparatus 100 is secured to the ground surface, a first electrical cord 210 having a first connector 215 and a second electrical cord 220 having a second connector 225 are provided. The first connector 215 and the second connector 225 are configured to interlock with each other. An electrical connection between the first and second electrical cords 210, 220 is then established by interlocking the first connector 215 with the second connector 225. To shelter and elevate the electrical connection above the ground surface, the first connector 215 and the second connector 225 are secured under the shelter 130 by placing either the first electrical cord 210, the second electrical cord 220, or both, within a securing member 120 of the apparatus 100. In a preferred methodology, the apparatus 100 comprises a first securing member and a second securing member. In such embodiment, first connector 215 and the second connector 225 are secured under the shelter 130 by securing the first electrical cord 210 to the first securing member and securing the second electrical cord 220 to the second securing member.

It is understood that versions of the inventive subject matter disclosed herein may come in different forms and embodiments. Additionally, it is understood that one of skill in the art would appreciate these various forms and embodiments as falling within the scope of the inventive subject matter disclosed herein.

What is claimed is:

1. An apparatus for use with electrical cords, said apparatus comprising:
   an elongated support member having a first end and a second end,
      wherein the second end is configured to secure the apparatus to a ground surface;
   a securing member disposed between the first end and second end of the support member,
      wherein the securing member is configured to support an electrical cord above the ground surface; and
   a shelter having an apex and a rim,
      wherein the apex is secured to the first end of the support member and the rim is positioned below the securing member, and wherein the shelter is configured to shelter the electrical cord supported above the ground surface by the securing member.

2. The apparatus of claim 1, wherein the shelter is removably secured to the first end of the support member.

3. The apparatus of claim 1, wherein the securing member is a hook.

4. The apparatus of claim 1, wherein the shelter is a dome.

5. The apparatus of claim 1, further comprising a platform attached to the support member between the first end and the second end of the support member,
   wherein the securing member is secured to the platform.

6. The apparatus of claim 1, wherein the second end of the support member is pointed.

7. The apparatus of claim 1 further comprising a ground plate,
   wherein the ground plate is configured to prevent the support member from being inserted into the ground surface past the ground plate.

8. The apparatus of claim 1, further comprising a protective cover having a drawstring laced therethrough,
   wherein the drawstring is configured to transition the protective cover from an open position to a closed position, and wherein the protective cover is configured to cover the securing member and the shelter.

9. The apparatus of claim 8, wherein the protective cover is removably secured to the apparatus by the drawstring.

10. An apparatus for use with electrical cords, said apparatus comprising:
    a stake having a first end and a second end,
       wherein the second end of the stake is configured to insert into a ground surface;
    a platform attached to the stake between the first end and the second end of the stake;
    a securing member secured to the platform,
       wherein the securing member is configured to support an electrical cord above a ground surface; and
    a dome having an apex and a rim,
       wherein the apex of the dome is secured to the first end of the stake such that the rim faces downwardly towards the second end of the stake.

11. The apparatus of claim 10, wherein the apex of the dome is removably secured to the first end of the stake.

12. The apparatus of claim 11, wherein the first end of the stake has a first interlocking member and the dome has a second interlocking member,
    wherein the first interlocking member and the second interlocking member are configured to interlock to removably secure the dome to the first end of the stake.

13. The apparatus of claim 11, wherein the rim of the dome is positioned below the securing member when the dome is removably secured to the first end of the stake.

14. The apparatus of claim 10, wherein the securing member is a hook.

15. The apparatus of claim 10, wherein the apparatus comprises two securing members.

16. The apparatus of claim 10, further comprising a ground plate,
wherein the ground plate is configured to prevent the stake from being inserted into the ground surface past the ground plate.

17. The apparatus of claim 10, further comprising a protective cover having a drawstring laced therethrough,
wherein the drawstring is configured to transition the protective cover from an open position to a closed position, wherein the protective cover is configured to cover the securing member and the dome, and
wherein the protective cover is removably secured to the apparatus via the drawstring.

18. A method for sheltering electrical cord connections in an elevated position, said method comprising the steps of:
providing an apparatus comprising:
an elongated support member having a first end and a second end,
wherein the second end is configured to secure the apparatus to a ground surface;
a securing member disposed between the first end and the second end of the support member,
wherein the securing member is configured to support an electrical cord above a ground surface; and
a shelter having an apex and a rim,
wherein the apex is secured to the first end of the support member and the rim is positioned below the securing member, and wherein the shelter is configured to shelter the electrical cord supported above the ground surface by the securing member;
securing the second end of the support member to the ground surface;
providing a first electrical cord having a first connector;
providing a second electrical cord having a second connector,
wherein the first connector and second connector are configured to interlock to electrically connect the first electrical cord to the second electrical cord;
interlocking the first connector and the second connector; and
securing the first connector and second connector under the shelter and above the ground surface via the securing member.

19. The method of claim 18, wherein the apparatus comprises a first securing member and a second securing member, and wherein the step of securing the first connector and second connector above the ground surface via the securing member comprises:
securing the first electrical cord to the first securing member; and
securing the second electrical cord to the second securing member.

* * * * *